United States Patent [19]

Jasne

[11] Patent Number: 4,724,053
[45] Date of Patent: Feb. 9, 1988

[54] METHOD FOR THE ELECTROPOLYMERIZATION OF CONDUCTIVE POLYMERS

[75] Inventor: Stanley J. Jasne, Andover, Mass.

[73] Assignee: Polaroid Corporation, Patent Dept., Cambridge, Mass.

[21] Appl. No.: 65,180

[22] Filed: Jun. 19, 1987

Related U.S. Application Data

[63] Continuation of Ser. No. 811,692, Dec. 20, 1985, abandoned.

[51] Int. Cl.$^4$ .................................................. C25C 1/00
[52] U.S. Cl. ................................... 204/59 R; 106/236; 264/239; 264/DIG. 61
[58] Field of Search .............. 204/35.1, 37.6, 59 R; 106/236–239; 264/239, DIG. 61

[56] References Cited

U.S. PATENT DOCUMENTS

| 2,753,331 | 7/1956 | Lacroix | 106/239 |
|---|---|---|---|
| 3,634,110 | 1/1972 | Varsanyi et al. | 106/239 |
| 4,219,382 | 8/1980 | Leffler | 106/239 |
| 4,468,291 | 8/1984 | Naarmann | 204/59 R |
| 4,487,667 | 12/1984 | Traynor | 204/59 R |
| 4,547,270 | 10/1985 | Naarmann | 204/59 R |
| 4,566,955 | 1/1986 | Naarmann | 204/59 R |
| 4,582,575 | 4/1986 | Warren et al. | 204/59 R |
| 4,582,587 | 4/1986 | Hotta et al. | 204/59 R |

FOREIGN PATENT DOCUMENTS

594134  9/1982  Japan ............................ 204/59 R

*Primary Examiner*—R. L. Andrews
*Attorney, Agent, or Firm*—Louis G. Xiarhos

[57] ABSTRACT

The invention comprises processing together an electropolymerized polymer and the anode on which it is formed by shaping them or by size reducing them and dispersing the resulting size reduced material into a liquid vehicle for production of a coatable composition.

18 Claims, No Drawings

METHOD FOR THE ELECTROPOLYMERIZATION OF CONDUCTIVE POLYMERS

This application is a continuation of application Ser. No. 811,692 filed Dec. 20, 1985, now abandoned.

BACKGROUND OF THE INVENTION

This invention relates to the production of electrically conductive organic polymers. More particularly, it relates to an improved method for the electropolymerization and recovery of processable conductive polymers.

Considerable effort has been expended by researchers toward the production of polymers which exhibit electrical conductivity. For example, in ORGANIC COATINGS AND PLASTICS CHEMISTRY, Vol. 43, pp. 774–6, Preprints of Papers Presented by the Division of Organic Coatings and Plastics Chemistry at the American Chemical Society 180th National Meeting, San Francisco, Calif., Aug, 24–29, 1980, there is reported by A. F. Diaz et al., in the paper "Electrosynthesis and Study of Conducting Polymeric Films", the electropolymerization of pyrrole, using a variety of electrolyte salts as counteranions. A summary of various approaches to the creation of electrically conducting polymers is reported, for example, by J. Frommer, in "Polymer Research Frontier: How Insulators Become Conductors", *Industrial Chemical News*, Vol. 4, No. 10, October 1983.

Polymeric materials which have been proposed as conductive polymers, for the most part, are characterized by one or more undesirable properties, including instability under ambient conditions, poor physical integrity (notably brittleness) and poor processability (insolubility or intractability) severely limiting the production or fabrication of conductive polymeric articles by conventional production or processing techniques.

While various applications for conductive polymers have been proposed, for example, in the manufacture of solar cells and batteries and for EMI shielding, the physical properties and/or processability of a conductive polymeric material will dictate in part the suitability of such materials to particular applications. In my copending application "Processable Conductive Polymers", U.S. Ser. No. 595,667, filed Apr. 2, 1984, there is disclosed and claimed a processable electrically conductive organic material and a method for the production of such polymer. As described therein, the conductive organic polymer is prepared by the electropolymerization of an electropolymerizable monomer (such as pyrrole) in the presence of a dispersed phase of polymer having anionic surface character (e.g., a polymeric latex having anionic surface character). The dispersed polyanionic polymer serves as a counterion in affiliation with cationic charges of the electropolymerized monomer and allows for the production of a processable conductive polymer material which, for example, can be processed by convenient coating methods into electrically conductive films.

While the conductive polymer material prepared by the aforedescribed method can be processed or fabricated by resort to thermal molding, extrusion or other shaping technique, or can be incorporated into a solvent or other liquid vehicle for the coating of an electrically conductive film or layer, the conductive polymer material must first be removed from the anode on which it is formed. Typically, the anode will be comprised of platinum, gold, tin oxide on glass, indium tin oxide on glass, or the like, and the electropolymerized conductive polymer material will be recovered therefrom by peeling and/or scraping. It will be appreciated that it would be advantageous from the standpoint of convenience and economy of operation if the electropolymerized conductive polymer could be recovered from an electropolymerization operation as a processable polymer material without need for the aforementioned step of removing the polymer material from the anode on which it is formed.

SUMMARY OF THE INVENTION

It has been found that improvements in the production and recovery of a processable electropolymerized conductive polymer can be realized by using as the anode in the electropolymerization of an electropolymerizable monomer, an electrically conductive polymeric anode processed (e.g., by coating or extrusion) from a processable polymer comprising an oxidatively polymerized polymer having cationic character in affiliation with polymeric particles having anionic surface character. The formation of an anode itself from a processable conductive polymer material, and use of such anode in the desired production of a processable electropolymerized conductive polymer, makes possible the recovery of both the anode and desired electropolymerized product (in processable form) by simultaneous processing (e.g., comminution, dispersion and/or solvation), without separation of the desired product from the anode.

Accordingly, there is provided by the present invention a method for the production of a processable electrically conductive organic polymer which comprises electropolymerizing an electropolymerizable monomer onto an anode in an electrolytic medium, said electrolytic medium comprising a reaction solvent for an electropolymerizable monomer; an electropolymerizable monomer exhibiting solubility in said reaction solvent; and a polymeric electrolyte having anionic surface character for affiliation with the cationic electropolymerized polymer on said anode, said polymeric electrolyte being present in said electrolytic medium in a dispersed phase during the electropolymerization of the electropolymerizable monomer; said anode being an electrically conductive anode processed from a processable polymer material comprising an oxidatively polymerized polymer having cationic character in affiliation with a polymeric counterion particle having anionic surface character.

For a fuller understanding of the present invention, reference should be made to the following detailed description.

DETAILED DESCRIPTION

As indicated hereinbefore, processing and operating advantages are realized by the employment in an electrochemical polymerization of an electrode (anode) which is processed from a processable polymer material. As used herein, the term "processed" in reference to such an electrode means that the electrode is prepared by a molding, extrusion or other shaping operation or by a coating operation involving the coating of a solution or dispersion of polymer material into a layer or film of organic conductive polymer. Similarly, the term "processable" in relation to a conductive polymer material refers to the capacity of the polymer material to be processed by resort to any of the aforementioned shaping or coating operations. Further, a processed anode, as used herein, refers to an anode which after having been processed, remains processable and which can, therefore, be simultaneously processed along with a conductive polymer material which is formed thereon by electropolymerization, without required separation from the anode.

The anode can be prepared, for example, by coating an emulsion or dispersion of conductive polymer material onto a support material such as glass, allowing the coating to dry to a film or layer and removing the film or layer from the support (as by peeling) to provide a free-standing film or layer useful as an electrode (anode) in an electro-chemical polymerization. In practice, a plurality of electrode films can be prepared from a single batch of processable conductive polymer material and can be used in a series of electropolymerization reactions. Upon completion of the series of reactions, the plurality of polymer-carrying anodes can then be combined and simultaneously treated (such as by comminution and incorporation into a liquid carrier or vehicle) for the production of a coatable polymeric material. It will be appreciated that the use of a plurality of processed and processable anodes in a series of polymerizations (and combination for common processing) avoids the need for polymer removal and electrode cleaning as prerequisite to re-use of a metallic electrode typically employed in an electropolymerization operation.

The processable electrode can be prepared from a processable conductive polymer material which comprises an oxidatively polymerized polymer having cationic character in affiliation with polymeric counterion particles having anionic surface character. Such a material can be prepared by the electropolymerization method described in my earlier referenced copending application, Ser. No. 595,667, filed Apr. 2, 1984. Alternatively, the electrode can be prepared from a processable conductive polymer material prepared by an oxidative polymerization method using a chemical oxidizing agent, as disclosed and claimed in my copending application, U.S. Ser. No. 811,281, filed Dec. 20, 1985. The electrode formed, for example, by coating such a polymer material into a free-standing electrically conductive film can be used in the electropolymerization method of the present invention.

An electropolymerization method suited to the production of a processable conductive polymer that can be used to provide a processable electrode involves (as described in the aforementioned application Ser. No. 595,667) the electropolymerization of an electropolymerizable monomer in the presence of a dispersed phase of counterion polymer having anionic surface character. A variety of electropolymerizable monomers can be used for this purpose. Suitable monomers are those which exhibit solubility in the medium in which they are electropolymerized and which have a half-wave oxidation potential below that of the solvent. In general, the monomeric comound will be soluble in the reaction solvent at least to be extent of $10^{-5}$ Molar. Preferably, the monomer compound will be dissolved in the solvent medium at a concentration of from $10^{-2}$ to $10^{-1}$ Molar, although the concentration utilized will depend upon the particular nature of the polymerizable compound and reaction solvent employed, and the desired rate of polymerization.

Useful aromatic heterocyclic compounds include pyrrole; N-substituted pyrroles; β-substituted pyrroles; thiophene; β-substituted thiophenes; furan; β-substituted furans; indole; and carbazole. Any electropolymerizable monomer can, however, be employed, provided that the oxidation potential thereof is lower than that of the solvent in which the polymerization is to occur. The electropolymerizable compound can be substituted with one or more substituent groups. In the case of a 5-membered heterocyclic compound, the α,α'-positions will be unsubstituted so as to permit α,α'-coupling of monomeric units in a polymer chain. It will be appreciated that the presence of substituent groups will influence the required oxidation potential for the conduct of the desired polymerization, the rate of polymerization at a fixed voltage or current or the properties of the resulting polymer. Suitable substituent groups include alkyl, aryl, aralkyl, alkaryl, hydroxy, methoxy, chloro, bromo and nitro substituents. Suitable substituent groups can be selected consistent with desired electropolymerization conditions and the properties desired in the resulting polymer.

A preferred class of aromatic heterocyclic compounds includes the 5-membered heterocyclic compounds having the formula

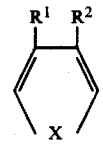

wherein each of $R^1$ and $R^2$ is independently hydrogen; alkyl (e.g., methyl or ethyl); aryl (e.g., phenyl); alkaryl (e.g. tolyl); or aralkyl (e.g., benzyl); or $R^1$ and $R^2$ together comprise the atoms necessary to complete a cyclic (e.g. benzo) structure; and X is

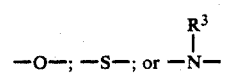

where $R^3$ is hydrogen, alkyl, aryl, alkaryl or aralkyl. These compounds provide in the resulting electropolymerized material, repeating units of the formula

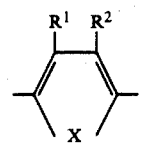

wherein $R^1$, $R^2$ and X have the definitions set forth hereinbefore.

Preferred monomers include pyrrole and the substituted pyrroles such as β-β'-dimethylpyrrole and β,β'-diphenylpyrrole. The polymerizable monomer of choice is pyrrole which polymerizes readily and which in affiliation with a polyanionic counterion permits the facile production of a conductive polymeric material which is stable and processable into a processable electrode.

Where an electropolymerization method is used to prepare the conductive material from which the processable electrode is prepared, the electropolymerization will be performed in a solvent medium which includes the polymerizable monomer and the polymeric electrolyte. The nature of the solvent can vary widely depending upon the nature of the polymerizable monomer and the polyelectrolyte employed. The oxidation potential of the solvent will be higher than that of the polymerizable monomer so as not to be preferentially oxidized. Preferably, the solvent will be poorly nucleophilic so as not to preferentially capture cation intermediates of the polymerizable monomer. Suitable examples include water, acetonitrile, dimethylsulfoxide and benzonitrile. Mixed aqueous organic solvent mixtures can also be employed. In the case of pyrrole, a preferred polymerizable monomer, water can be conveniently employed.

The dispersed-phase polyanionic counteranion employed as the electrolyte provides the electrochemical neutrality for the cationic polymer produced by oxidative electropolymerization and serves an important function in conferring processability. In the production of a conductive polymer from an electropolymerizable monomer such as pyrrole, thiophene or the like, the anion of the supporting electrolyte will comprise an integral portion of the resulting organic conducting polymer. The stoichiometry of, for example, a conductive polymer of an aromatic heterocyclic compound, can be appreciated by reference to the following formula (I) for polypyrrole (Mol. Cryst. Liq. Cryst., 1982, Vol. 83, pp. 253-264):

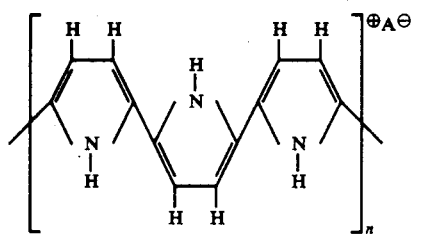

(I)

wherein $A^{\ominus}$ represents the electrochemically stoichiometric anion and n is an integer. It will be seen from inspection of formula (I) that the relative weight of the counteranion $A^{\ominus}$ in relation to the cationic portion will depend upon its size.

In an electropolymerized processable conductive polymer used to provide a processable electrode, the anionic portion of the conducting polymer will comprise a bulky counterion as a consequence of employing, as a supporting electrolyte for the desired electropolymerization, a polymer having anionic surface character. The polymeric counteranion comprises a major proportion by weight of the conductive polymer and markedly enhances physical properties and processability. When the counterion is, for example, a sulfonate or sulfate group on the surface of a latex particle, it will have a major influence on the final weight percent of each of the cationic and anionic portions. In general, the polymeric counterion will comprise from about 50% to about 97% by weight of the conductive polymer. Correspondingly, repeating units from the electropolymerizable monomer will comprise from about 3% to about 50% by weight.

The nature of the polymer utilized as a supporting electrolyte can vary with the nature of the physical properties desired in the resulting conductive polymer. Inasmuch as the nature of the counteranion as a bulky moiety in relation to the cationic moiety will cause the counteranion to constitute a relatively large percentage (by weight) of the resulting polymer, it will be appreciated that considerable latitude will be afforded in tailoring the physical properties of a conductive polymer to the predetermined requirements of a particular application by suitable choice of the polyanionic polymeric counterion.

In an electropolymerization used to prepare a processable electrode material, the supporting electrolyte polymer is employed in a dispersed phase. As used herein, a dispersed phase refers to a stable dispersion or emulsion of polymer in the liquid or solvent used to perform the electropolymerization. The liquid can (and preferably will) be water, although other solvent materials, as pointed out hereinbefore, can be used as the solvent for the electro-polymerizable monomer. The polyanionic polymer used as the supporting electrolyte must, however, be present during electropolymerization as a dispersed phase so as not to adversely interfere with polymer growth which occurs by electropolymerization of the electropolymerizable monomer at the surface of the electrode (anode). It has been found that a soluble or highly swollen polyanionic supporting electrolyte tends to form a very thin film or coating of conductive material at the anode surface, effectively attenuating further growth of the conductive polymer.

A dispersed phase of polyanionic supporting electrolyte in the electrolytic medium can be conveniently provided by preparing an emulsion polymer or latex according to conventional emulsion polymerization techniques. The preparation of latices is ordinarily accomplished by polymerizing an ethylenically unsaturated monomer (or mixture of copolymerizable ethylenically unsaturated comonomers) in a suitable solvent such as water, a water-soluble hydroxylated organic solvent such as alcohol, polyhydroxy alcohol, keto alcohol, ether alcohol or the like, or in a mixture of water and such a hydroxylated solvent, such a mixture usually containing a major amount of water. The preparation of a latex will normally be accomplished by polymerization of an ethylenically unsaturated monomer (or mixture of comonomers) in the presence of a surfactant, dispersing agent, emulsifier or protective colloid, the material being present in sufficient quantity to cause formation of a stable emulsion. Suitable surfactants, emulsifiers and colloid materials used in the production of latices include cationic materials such as stearyl dimethyl benzyl ammonium chloride; nonionic materials such as alkyl aryl polyether alcohols and sorbitan monooleate; anionic materials such as sodium dodecylbenzene sulfonate, dioctyl sodium sulfosuccinate, sodium salts of alkyl aryl polyether sulfates and sodium alkyl (e.g., lauryl) sulfates; alkali metal salts of lignosulfonic acids, and silicic acids; and colloidal materials such as casein, sodium polyacrylate, carboxymethylcellulose, hydroxyethylcellulose, gelatin, sodium alignate or polyvinyl alcohol. The particular surfactant or like material employed can be varied depending upon the desired properties of the latex polymer and the nature of the polymerizable monomers thereof.

The dispersed phase of polymer will have a polyanionic surface character. The negatively charged (polyanionic) surface character can be incorporated into the polymeric supporting electrolyte in various ways. For example, an ethylenically unsaturated polymerizable monomer having a strong ionic group, e.g., a sulfate or sulfonate group, can be used as a polymerizable monomer in the production of the polymeric supporting electrolyte. Thus, a copolymerization surfactant including a polymerizable ethylenically unsaturated moiety and a sulfate or sulfonate group can be polymerized by emulsion polymerization technique with an ethylenically unsaturated monomer or mixture thereof to provide a polymer latex having the anionic surface character of the sulfate or sulfonate moiety. A suitable copolymerizable monomer for this purpose is a copolymerizable short-chain vinyl sulfonate such as the sodium salt of allyl ether sulfonate (available as COPS I, Alcolac, Inc.) having the formula:

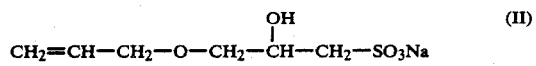

$$CH_2=CH-CH_2-O-CH_2-\underset{\underset{OH}{|}}{CH}-CH_2-SO_3Na \qquad (II)$$

Other polymerizable monomers having an anionic group include 2-sulfoethyl methacrylate; 2-acrylamido-2-methylpropanesulfonic acid; vinylbenzene sulfonic acid; sodium vinyl sulfonate; or the salts of any of the aforementioned acids. Other polymerizable monomers capable of introducing anionic character to a dispersed phase of polymer can, however, be suitably employed.

The polyanionic surface character of the polymeric dispersed-phase supporting electrolyte can also be the result of the utilization of an anionic surfactant (having a strong ionic character) in connection with the manufacture of the polymer by emulsion polymerization technique. Thus, a surfactant or emulsifier having, for example, a sulfate or sulfonate moiety can be employed as the surfactant or emulsifier according to known emulsion polymerization technique for the production of a latex having the anionic surface character of the anionic moiety. Any of the anionic surfactants or emulsifiers mentioned hereinbefore can be used for this purpose. It will be preferred, however, to incorporate polyanionic surface character by using a copolymerizable surfactant compound as hereinbefore described.

As mentioned previously, the physical properties of the conductive polymers of the invention will be influenced materially by the nature of the polyanionic counterion polymer and, accordingly, the comonomers utilized in the production of polyanionic polymers can be selected so as to introduce predetermined properties suited to a particular application. Thus, a variety of ethylenically unsaturated compounds can be employed to produce a polymeric polyelectrolyte, provided that surface anionic character is introduced into the polymer and provided that the polyelectrolyte polymer be capable of being in a dispersed state in the electrolytic medium employed for the electrochemical polymerization. Examples of such monomers include the esters of unsaturated alcohols such as vinyl alcohol and allyl alcohol with saturated acids such as acetic, propionic or stearic acids, or with unsaturated acids such as acrylic or methacrylic acids; the esters of saturated alcohols with unsaturated acids such as acrylic and methacrylic acids; vinyl cyclic compounds such as styrene; unsaturated ethers such as methyl vinyl ether, diallyl ether and the like; the unsaturated ketones such as methyl vinyl ketone; unsaturated amides such as acrylamide, methacrylamide and unsaturated N-substituted amides such as N-methyl acrylamide and N-(1,1-dimethyl-3-oxobutyl) acrylamide; unsaturated aliphatic hydrocarbons such as ethylene, propylene and the butenes including butadiene; vinyl halides such as vinyl chloride, vinyl fluoride and vinylidene chloride; esters of unsaturated polyhydric alcohols such as esters of butenediol with saturated or unsaturated acids; unsaturated acids such as acrylic acid, methacrylic acid, maleic, fumaric, citraconic or itaconic acids (or the halides or anhydrides thereof); and unsaturated nitriles such as acrylonitrile or methacrylonitrile. Other polymerizable monomers can be employed to introduce desired properties such as hydrophobicity, hydrophilicity or the like and can contain particular moieties such as silicone, fluoro, oxirane, oximino or other groups to provide properties suited to particular applications.

Preferably the counterion polymer will be prepared by emulsion polymerization and will be in the form of a latex. Utilization of a dispersed polymer, e.g., a polymeric latex that can be conveniently coated into a polymer film, contributes importantly to the production by conventional coating methods of an electrically conductive film suited to application as an electrode. Known emulsion polymerization techniques as described hereinbefore can be used for this purpose. Free radical catalysts such as the peroxides, alkali metal or ammonium persulfates, azobisisobutyronitrile or the like can be used for the provision of suitable latices. The size of dispersed, e.g., latex, particles and the surface charge density can be varied substantially by resort to variations in the nature of the monomers employed and the conditions of polymerization, as is known by those skilled in the art. In general, polymer particles having an average particle size diameter of 100 to 400 nanometers provide good results. Other particle sizes can, however, be utilized.

A polyanionic polymer can be prepared by other techniques and can then be provided in a liquid medium as a dispersed phase. For example, a solution-polymerized polymer can be dispersed in a non-solvent material. Care should be exercised, however, in the production of a dispersion to avoid conditions promoting appreciable solubilization of the polymer in the desired dispersing medium.

When an electropolymerization method is used to prepare the polymer from which the processable electrode is prepared, the electropolymerization is performed according to known methods for effecting electropolymerizations. Typically, a one-compartment cell containing a reaction solvent, a polymeric supporting electrolyte and the polymerizable compound will be used. A conventional apparatus comprising platinum working and counter electrodes and a reference electrode (e.g., an aqueous saturated calomel reference electrode or silver/silver nitrate reference electrode) can be suitably employed. Other working electrode materials such as gold metal sheet, tin oxide on glass or indium tin oxide on glass can be used, or other electrode materials that will allow the polymer to build up and to adhere and which will not be electrochemically corroded or damaged under the electropolymerization conditions. The working electrode can vary in shape or configuration although a flat electrode will be preferred for the production thereon of a film of polymer. A galvanostatic electropolymerization can also be performed, if desired.

The reaction conditions of the electropolymerization will vary with the nature of the polymerizable monomer and the solvent. In the case of a preferred monomer (pyrrole) in a preferred solvent (water), electropolymerization can be initiated by raising the potential of the working electrode (against a silver/silver nitrate reference electrode) to about +0.75 volt or can be performed galvanostatically at a predetermined current density. The current or voltage can be increased or decreased or be held at a fixed amperage or voltage sufficient to permit initiation and completion of the desired electropolymerization. The electropolymerization can be effected in an electrolytic medium open to ambient conditions or can be accomplished under an atmosphere of nitrogen or other inert gas. Electropolymerization can be terminated when the polymer is prepared to desired thickness.

The electropolymerized material will normally be formed on the working electrode (anode) and can be a very thin film or a thick deposit, depending upon the polymerization conditions. The electrode can be removed from the electrolytic medium for recovery of the polymer material, which can be scraped, peeled or otherwise removed from the electrode surface as a conductive polymer. The polymeric material will generally be washed with water and allowed to dry. The polymer can be removed from the electrode while still wet or after air or heat drying.

While applicant does not wish to be bound by any particular theory or mechanism in explanation of the manner in which a conductive and processable polymer material is electrochemically prepared, it is believed that a series of oxidation and deprotonation steps is involved in the production of a polymer from the electropolymerizable monomer. It is believed that the electropolymerization reaction is allowed to continue in the electrolytic medium by the presence of the polyanionic counteranion polymer in a dispersed state. The conductive polymer is generated in the oxidized doped state and can, thereafter, be electrochemically reduced to the undoped neutral state. In the case, for example, of polypyrrole, the structure in the oxidized doped state (III) and in the undoped neutral state (IV) can be seen in the following representations:

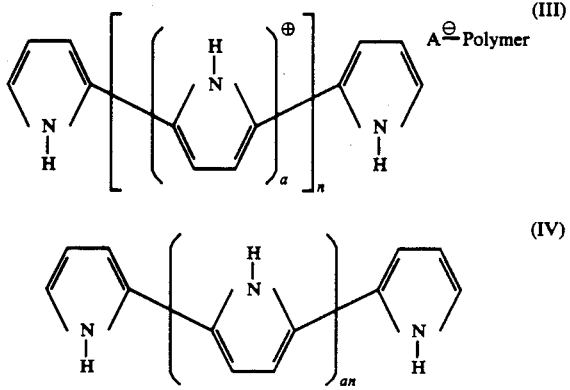

wherein a is a value in the range of about two to about four, depending upon the nature of the charge distribution of the particular counteranion $A^\ominus$ present on the surface of the polyelectrolyte polymer and n is an integer. It will be appreciated that the presence of a plurality of $A^\ominus$ moieties on the surface of the polymeric electrolyte allows a number of such moieties to be affiliated with the illustrated cation; and it will be understood that not all anionic moieties $A^\ominus$ on the surface of the polyelectrolyte polymer will be in affiliation with the illustrated cation.

The electropolymerized material, prepared as described, can be processed into an electrode by resort to known processing techniques such as thermal molding, extrusion or other shaping technique. If desired, the electropolymerized material can be taken up into a known solvent for the parent dispersed phase polymer and can be coated onto a substrate material, to provide a conducting layer or film of polymer. The coating composition can be coated onto glass, metal or other substrate, preferably of smooth surface, for recovery by peeling of a free-standing film of electrically conducting polymer. If desired, the coated composition can be allowed to dry on the substrate and used along with the supporting substrate as an electrode in an electrochemical method.

The electropolymerized conductive material, in general, appears not to be truly soluble according to strict definition and for the mot part exhibits only limited solubility. The polymer material can, however, be highly swollen in an organic vehicle or formed into a pseudo-solution sufficiently to be coated onto a substrate, and upon drying of the coated layer, there is provided an electrically conducting film that can be used as an electrode for the conduct of electrochemical reactions. In the case, for example, of an electropolymerized polymer from pyrrole and a latex couterion, the polymeric deposit can be removed by scraping from the anode, comminuted or otherwise size reduced, and introduced into a solvent such as tetrahydrofuran. The resulting coating composition, containing the conductive polymer at a solids level of, for example, ten weight percent, can be coated onto glass, and dried and peeled therefrom as a free-standing electrode material.

In general, it will be preferred to coat a plurality of electrode films from a batch or supply of coating composition as described. The size of the films can vary depending upon the nature of the desired reaction to be performed using the electrode film. Desired product obtained from a series of reactions using the electrode films can be subjected to common treatment for the realization of operating economies.

If desired, a processable conductive polymer material can be prepared by a method other than the electropolymerization process described herein. In this case, the conductive polymer material can be prepared by the method forming the subject matter of my co-pending application, U.S. Ser. No. 811,281, filed Dec. 20, 1985, wherein there is disclosed and claimed a method for preparing a processing conductive polymer using an oxidizing agent such as potassium persulfate for the oxidative polymerization of an oxidatively polymerizable monomer. The method comprises oxidatively polymerizing, in a polymerization reaction medium, a monomer oxidatively polymerizable to a cationic polymer, the reaction medium including a reaction medium-soluble oxidizing agent for the oxidatively polymerizable monomer, and in a dispersed phase in the reaction medium during the polymerization (and as a counterion for the cationic polymer) a polymer (such as a latex) having anionic surface character.

Any of the polymerizable monomers and polymers having polyanionic surface character described in connection with the electropolymerization method herein described can be used in the method of my application, U.S. Ser. No. 811,281 filed Dec. 20, 1985. The polymeric product prepard by the method of such application (in the form of a coatable dispersion in a liquid medium of polymeric particles comprising an oxidatively polymerized polymer having cationic character in affiliation with a dispersed phase of anionic polymer having anionic surface character) can be used to prepare electrically conducting films by convenient coating methods. Such films can be used as electrodes in the performance of electrochemical reactions.

A processed electrode film prepared as herein described can be used as the working electrode for the conduct of an electropolymerization reaction according to known methodology. The electrode film can be used in any electrolytic medium that does dissolve the electrode and can be used, for example, to effect the electropolymerization of any of the electropolymerizable monomers used in the preparation of the electrode polymer material itself. Similarly, any of the polymers having anionic surface character and described in connection with such preparation, can be used in an electropolymerization method using such an electrode. The composition of a conductive polymer material formed on the processed electrode can be the same as (or different from) the composition of the processed electrode.

The processed (processable) electrode can be used to conduct the electropolymerization of an electrically polymerizable monomer such as pyrrole, using any of the counteranion materials heretofore utilized for such a polymerization including $BF_4^-$; $ClO_4^-$; $AsF_6^-$; toluenesulfonate; or oxylate anion (as described in the hereinbefore referenced Diaz et al. publication). Inasmuch as the use of such counterion materials, in general, results in the production of a conductive polymer material having inferior (e.g., brittle) physical properties, it will be appreciated that the advantages to be derived from the use of a processed (processable) anode according to the present invention will be maximized where the processed anode is used for the production of a conductive polymer which also shows processability. Accordingly, such advantages can be maximized by the use of the processed anode for the production of a conductive polymer from a polyanionic counterion material.

The invention will be further described by reference to the following Example which is intended to be illustrative and non-limiting.

EXAMPLE 1

Part A.—A two-liter, round-bottomed flask was fitted with a condenser, mechnical stirrer, gas inlet (and outlet), thermometer, and dropping funnel. Water (1136 grams) and 30 mls. of COPS I copolymerizable surfactant (a short-chain vinyl sulfonate, 40% active, available from Alcolac, Inc.) were added to the flask. The contents were heated to 80° C. while purging with nitrogen. A pre-mix of the following monomers was prepared: 69 mls. methyl methacrylate; 142 mls. ethyl acrylate; and 2.5 mls. methacrylic acid. To the heated contents of the flask were added ten mls. of the monomer pre-mix and 30 grams of potassium persulfate. The resulting mixture was heated at 80° C. for ten minutes. At this point, the nitrogen purge was placed above the liquid level and the remaining quantity of the monomer pre-mix was added over a 70-minute period. The resulting latex was heated at 80° C. for an additional 45 minutes, was cooled at room temperature and was filtered through cheese cloth. The latex was dialyzed for seven days. The latex had a solids content of 11.92%.

Part B.—Five hundred grams of the dialyzed latex (prepared as described in Part A above) was diluted with 100 mls. of water containing 2.72 grams sodium octanesulfonic acid (a 10% solution). The mixture was introduced into a conventional single-cell electrochemical apparatus comprised of a one-liter beaker, a platinuim anode and a stainless steel cathode. Pyrrole (12.8 mls.) was added and polymerization thereof was run at one milliamp/cm.$^2$ for 16 hours at room temperature. A black film was observed to form on the anode. The anode was removed from the electrolytic cell and rinsed with water. The polymer film was scraped from the anode. Conductivity (measured by a conventional four-probe technique) was $3.5 \times 10^{-1}$ ohm$^{-1}$ cm.$^{-1}$ for the still-wet sample. After drying (by heating for 0.5 hour at 100° C.) conductivity was again measured (1 ohm$^{-1}$ cm.$^{-1}$).

Part C.—A cast film of conductive polymer was prepared in the following manner. A sample of the conductive polymer material prepared in the manner described in Part B of this Example was comminuted and added to 1,1,1-trichloroethane at a ten percent (by weight) concentration. The resulting dispersion was puddle cast into a film which was allowed to dry, yielding a film of 127 mgs. weight. Conductivity was measured by four-probe conductivity technique ($3.8 \times 10^{-1}$ ohm$^{-1}$ cm.$^{-1}$).

EXAMPLE 2

Part A.—A latex was prepared in the manner described in Part A of Example 1, except that 12 grams of 2-sulfoethyl methacrylate were employed in place of the 30 mls. of copolymerizable surfactant there employed. Thirty mls. of a monomer pre-mix (constituted as in Part A of Example 1) were initially charged and the reaction mixture was heated at 80° C. for two minutes. Thirty grams of potassium persulfate were added and an exotherm of 83°-84° C. was recorded. The reaction mixture was heated at 80° C. for ten minutes and the remainder of the monomer pre-mix was added over a period of 72 minutes. The reaction mixture was heated for 45 minutes at 80° C. and cooled to room temperature. The product was filtered through cheesecloth and dialyzed for eight days. A latex having a solids content of 9.64% was obtained.

Part B.—The electropolymerization of pyrrole using the polymer of Example 2, Part A as a counterion and the conductive polymer film of Example 1, Part C as the anode was performed in the following manner. Into an electrochemical apparatus comprised of a beaker, a platinum cathode and a polypyrrole anode (the film of Part C of Example 1), were introduced 75 mls. of the 9.6% solids latex obtained from Part A of this Example. To the electropolymerization vessel were added 340 mgs. of sodium trifluorooctanoate. Pyrrole monomer (3-4 mls.) was added and the electropolymerization medium was scanned from zero to 1.5 volts and then held at one milliamp/cm.$^2$ (about 9 milliamps). Initially, a voltage in excess of five volts was required to maintain the amperage. After several minutes, the required voltage decreased. The polymerization was run for about 17.5 hours during which time the growth (build-up) of polymer material on the anode was observed. The anode was removed and dried at 100° C. for 1.25 hours. The weight of the anode and polymer thereon was recorded (740 mgs.).

The anode containing processable conductive polymer thereon, prepared as described in this Example, can be comminuted and incorporated into a vehicle such as tetrahydrofuran, trichloroethane or other solvent for the parent counterion polymer to provide a coatable dispersion suited to the production of electrically conductive films or layers.

What is claimed is:

1. A method for the production of a processable electrically conductive polymer which comprises the steps of:

electropolymerizing an electropolymerizable monomer onto an anode in an electrolytic medium, said electrolytic medium comprising a reaction solvent for an electropolymerizable monomer, an electropolymerizable monomer exhibiting solubility in said reaction solvent, and a polymeric electrolyte having anionic surface character for affiliation with the cationic electropolymerized polymer on said anode, said polymeric electrolyte being present in said electrolytic medium in a dispersed phase during the electropolymerization of the electropolymerizable monomer, said anode being an electrically conductive anode processed from a processable conductive polymer material comprising an oxidatively polymerized polymer having cationic character in affiliation with a polymeric counteranion particle having anionic surface character; and processing together, the electropolymerized polymer and the anode on which it is formed, by shaping the electropolymerized polymer and anode or by size reducing the electropolymerized polymer and anode and dispersing the resulting size reduced material into a liquid vehicle therefor for production of a coatable composition.

2. The method of claim 1 wherein said anode is an electrically conductive film coated from a dispersion of conductive polymer comprising an oxidatively polymerized polymer having cationic character in affiliation with a polymeric counteranion particle having anionic surface character.

3. The method of claim 2 wherein said dispersion of conductive polymer is prepared by electropolymerizing an oxidatively polymerizable monomer in the presence of a dispersed phase of anionic polymer having anionic surface character and dispersing the electropolymerized polymer in a liquid vehicle.

4. The method of claim 2 wherein said dispersion of conductive polymer is prepared by oxidatively polymerizing an oxidatively polymerizable monomer in a polymerization reaction medium comprising a reaction medium—soluble oxidizing agent and a dispersed phase of counterion polymer having anionic surface character.

5. The method of claim 1 wherein said anode is processed from a processable conductive polymer material comprising from 3% to 50% by weight of said oxidatively polymerizable polymer having cationic character in affiliation with from 50% to 97% of said polymeric counteranion particle having anionic surface character.

6. The method of claim 1 wherein said electrically conductive anode is processed from a conductive polypyrrole wherein the counterion is a polymeric latex having anionic surface character.

7. The method of claim 1 wherein said electropolymerizable monomer in said reaction solvent is pyrrole.

8. The method of claim 7 wherein said polymeric electrolyte in said electrolytic medium in a dispersed phase is a polymeric latex having anionic surface character.

9. The method of claim 8 wherein said anionic surface character of said latex comprises sulfate or sulfonate groups.

10. The method of claim 1 wherein said reaction solvent is water.

11. The method of claim 1 wherein said polymer electropolymerized onto said anode and said anode are together size reduced and dispersed into said liquid vehicle.

12. A method for the production of a processable polypyrrole which comprises the steps of:

electropolymerizing pyrrole onto an anode in an aqueous electrolytic medium, said electrolytic medium having dispersed therein during the electropolymerization polymeric latex particles having anionic surface character, said anode being an electrically conductive anode processed from a processable conductive polymer material comprising an oxidatively polymerized polymer having cationic character in affiliation with a polymeric counteranion particle having anionic surface character; and processing together, the polypyrrole and the anode on which it is formed, by shaping the polypyrrole and the anode or by size reducing the polypyrrole and anode and dispersing the resulting size reduced material into a liquid vehicle therefor for production of a coatable polypyrrole composition.

13. The method of claim 12 wherein said anode is an electrically conductive film coated from a dispersion of conductive polymer comprising an oxidatively polymerized polymer having cationic character in affiliation with a polymeric counteranion particle having anionic surface character.

14. The method of claim 13 wherein said dispersion of conductive polymer is prepared by electropolymerizing an oxidatively polymerizable monomer in the presence of a dispersed phase of anionic polymer having anionic surface character and dispersing the electropolymerized polymer in a liquid vehicle.

15. The method of claim 13 wherein said dispersion of conductive polymer is prepared by oxidatively polymerizing an oxidatively polymerizable monomer in a polymerization reaction medium comprising a reaction medium-soluble oxidizing agent and a dispersed phase of counterion polymer having anionic surface character.

16. The method of claim 1 wherein said anode is processed from a processable polypyrrole conductive polymer comprising from 3% to 25% polypyrrole in affiliation with from 75% to 97% of polymeric latex particles having anionic surface character.

17. The method of claim 16 wherein said anionic surface character of said latex particles comprises sulfonate or sulfate groups.

18. The method of claim 12 wherein said polypyrrole and anode are together size reduced and dispersed into said liquid vehicle.

* * * * *